United States Patent
Ames et al.

(10) Patent No.: US 6,352,299 B1
(45) Date of Patent: *Mar. 5, 2002

(54) PLASTIC REPLACEMENT WINDOW WITH EXTENSION FOR VEHICLES

(76) Inventors: Marc L. Ames, 14 Estate Rd., Hillsborough, NJ (US) 08844; Henry H. Magenheim, 1902 Ave. L, Brooklyn, NY (US) 11230

( * ) Notice: Subject to any disclaimer, the term of this patent is extended or adjusted under 35 U.S.C. 154(b) by 0 days.

This patent is subject to a terminal disclaimer.

(21) Appl. No.: 09/940,023

(22) Filed: Aug. 27, 2001

Related U.S. Application Data

(63) Continuation-in-part of application No. 09/359,258, filed on Sep. 22, 2000, which is a continuation-in-part of application No. 08/967,933, filed on Nov. 12, 1997, now abandoned, which is a continuation of application No. 08/432,631, filed on May 2, 1995, now abandoned, which is a continuation-in-part of application No. 07/931,206, filed on Aug. 17, 1992, now Pat. No. 6,063,477.

(51) Int. Cl.$^7$ .................................................. B60J 1/08
(52) U.S. Cl. ...................... 296/146.2; 296/1.1; 296/152; 296/63; 297/219.1; 297/228.1
(58) Field of Search ............................. 296/146.2, 1.1, 296/152, 63; 297/219.1, 228.1

(56) References Cited

U.S. PATENT DOCUMENTS

| | | | | | |
|---|---|---|---|---|---|
| 2,536,773 A | * | 1/1951 | Saidel | ........................ | 206/41 |
| 2,619,168 A | * | 11/1952 | Leverence | .................. | 160/354 |
| 3,085,621 A | * | 4/1963 | Meranto | ....................... | 160/91 |
| 3,411,562 A | * | 11/1968 | Garrett | ........................ | 160/327 |
| 3,653,497 A | * | 4/1972 | Hornstein | .................... | 206/46 |
| 4,375,308 A | * | 3/1983 | Wilkinson | ................... | 339/17 |
| 4,497,515 A | * | 2/1985 | Appelson | ................... | 296/141 |
| 4,654,240 A | * | 3/1987 | Johnston | ...................... | 428/35 |
| 4,707,018 A | * | 11/1987 | Gavagan | ..................... | 296/97 |
| 4,743,061 A | * | 5/1988 | Pompa | ........................ | 296/97 |
| 4,749,222 A | * | 6/1988 | Idland | .......................... | 296/97 |
| 4,875,308 A | * | 10/1989 | Peetz et al. | ................. | 296/146 |
| 4,889,754 A | * | 12/1989 | Vargas | ....................... | 296/95.1 |
| 5,044,776 A | * | 9/1991 | Schramer et al. | ............. | 383/89 |
| 5,340,189 A | * | 8/1994 | Goodman | ................... | 296/152 |
| 5,417,273 A | * | 5/1995 | Bamonte | ................. | 296/146.2 |
| 5,524,694 A | * | 6/1996 | Arapis | ........................ | 296/152 |
| 5,879,048 A | * | 3/1999 | Tower | ........................ | 296/152 |
| 6,063,477 A | * | 5/2000 | Ames et al. | ................. | 428/192 |

* cited by examiner

*Primary Examiner*—Ken Patel
(74) *Attorney, Agent, or Firm*—Kenneth P. Glynn, Esquire

(57) ABSTRACT

The present invention is a temporary plastic replacement window with extension, for vehicles, which includes two sheets of a flexible transparent film, attaching means for attaching the two sheets, wherein together the two sheets form an envelope when attached, and an extension to the envelope being connectable to one of the two sheets through connecting means. The two sheets are pre-cut to a pattern that is shaped to snugly fit over a broken vehicle window frame. The envelope is sized and shaped to fit snugly over a frame of a vehicle door having the broken window. The extension is made of sheet material impenetrable by shards of glass and being a polymeric or natural material. When the extension is placed across a vehicle seat next to the broken window and connected to the envelope, penetration of shards of glass into one's clothing and person, is prevented.

20 Claims, 2 Drawing Sheets

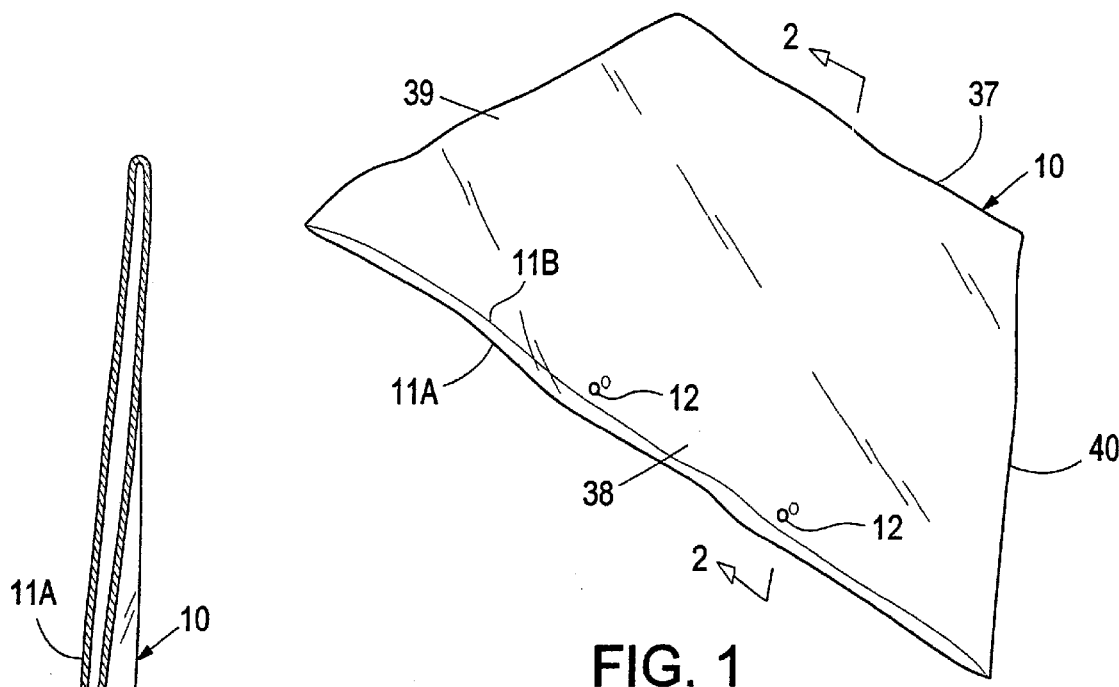
FIG. 1
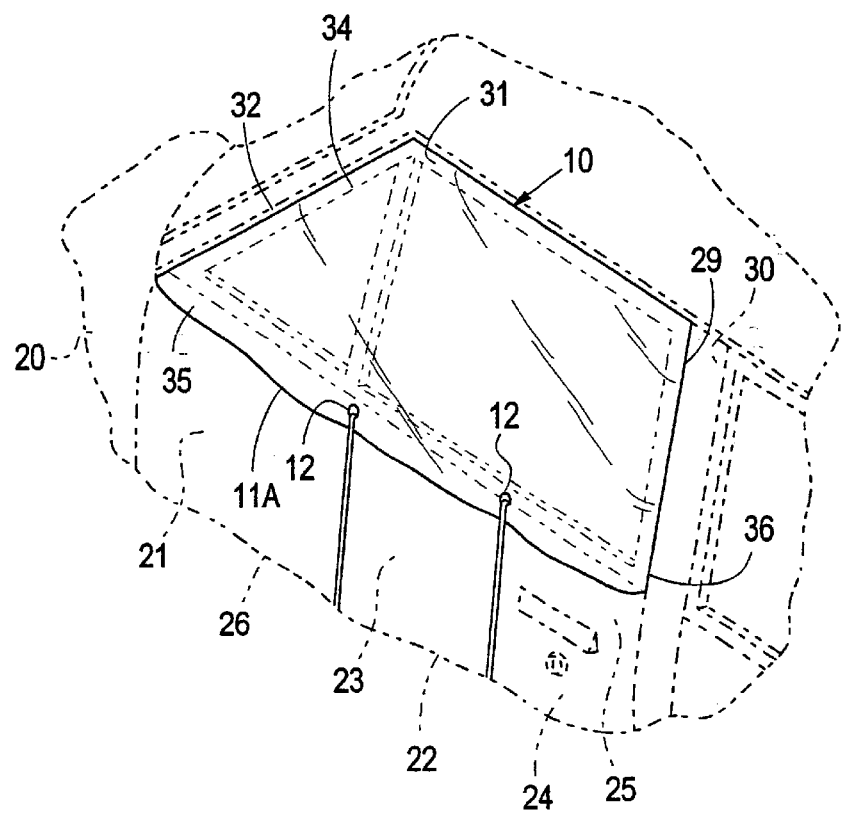
FIG. 2
FIG. 3

PLASTIC REPLACEMENT WINDOW WITH EXTENSION FOR VEHICLES

REFERENCE TO RELATED APPLICATION

This application is a continuation-in-part of copending U.S. patent application Ser. No. 09/359,258, filed on Sep. 22, 2000, entitled "Plastic Window Replacement System for Automobiles", which is a continuation-in-part of U.S. patent application Ser. No. 08/967,933, filed on Nov. 12, 1997, now abandoned, entitled "Plastic Replacement Windows for Automobiles", which is a continuation of U.S. application Ser. No. 08/432,631, filed on May 2, 1995 now abandoned, entitled "Plastic Replacement Windows for Automobiles", which is a continuation-in-part of U.S. application Ser. No. 07/931,206, entitled "Plastic Replacement Windows for Automobiles", filed on Aug. 17, 1992, and issued on May 16, 2000 bearing U.S. Pat. No. 6,063,477, all by the same inventors herein.

BACKGROUND OF THE INVENTION

1. Field of the Invention

The present invention relates to a temporary replacement window with extension that can be used to cover and protect the opening in any vehicle door that results when the vehicle door has missing or broken glass on either the passenger or driver's side of the vehicle. More specifically, the present invention includes two sheets of clear, transparent, flexible, substantially air impervious continuous plastic material attached together so as to form an envelope, which will fit snugly over the upper portion of the door frame of the vehicle. The sheets comprising the envelope are attached together at portions of their sides and are shaped to conform in general to the perimeter shape of the door frame. The objective is that the envelope will completely cover the opening left by the broken or missing window. The two sheet envelope of the present invention has a plurality of symmetrically positioned, grommeted apertures, which are positioned parallel to each other along the bottom open edge of the temporary window. To further secure and stabilize the replacement window against the force of the wind while the vehicle is moving, a cord is passed through these grommeted apertures and affixed securely to a protrusion in the interior of the vehicle. The envelope must be held taut while in place. Further, the present invention includes a detachable extension which is affixed to the two plastic sheet envelope and is situated in the interior of the vehicle. The detachable extension covers the seat base adjacent the broken window and protects the buttocks and thighs of the driver/passenger from being cut by shards of glass resulting from the broken window. The present invention provides a flexible see-through plastic temporary replacement window with extension, which is portable and easily installed on a vehicle door, and easily moved from vehicle to vehicle.

2. Information Disclosure Statement

The use of an article employing a sheet of plastic film to temporarily cover the opening or hole produced by a broken or missing window glass or the like, is generally known in the prior art; but all such articles of manufacture have various limiting features which neither detract from the novelty of the presently disclosed article, nor make it obvious. Generally, in the prior art, the replacement window was a make-shift article of some type of film that is tied or taped to the door frame surrounding the opening. This arrangement provides a temporary cover to the opening in the door until a permanent repair of the glass can be made. Such a solution is both messy and very inconvenient to install. It may require considerable effort to clean up the shards of glass and other residue remaining after such temporary installation. Other temporary measures utilize glue, tape or other adhesive, any one of which is difficult or hard to remove from both the body of the vehicle and the user's hands. Other aspects must be considered in dealing with a broken side window of an automobile. Unless the film is transparent, visibility while driving will be impaired. If the film is loosely installed or of incorrect thickness, the sound produced while driving may be annoying, if not distracting or deafening to the driver, increasing the risk of an accident during operation of the vehicle. The ability to seal the film reliably, such as to produce a good moisture or rain barrier, can be difficult, if not impossible, using the existing art. Furthermore, the art extant, does not adequately prevent the migration of the remaining glass fragments (shards) of the broken window into the car's interior. Moreover, storage in the vehicle of the article of the present invention, does not pose the same problems as storing glue or adhesive over an extended period of time under various climatic conditions as required by some other prior art methods.

In view of these problems and limitations associated with the prior art, the need is clear for an inexpensive, functional and reliable temporary replacement window, particularly for automobile side windows which are described herein.

U.S. Pat. No. 2,536,773 discloses a recloseable self-sealing container made of normally pressure-sensitive self-sealing material. Applicants' structure has outside and inside sheets that are substantially the same dimensions from top to bottom. This defines the length of each sheet as being substantially the same. Saidel's structure with its pocket portion 16 and elongated closing flap 18 of unequal length is different from the structure of the present invention.

U.S. Pat. No. 2,619,168 to Leverence describes and illustrates a foldable and compactly packagable screen for use in screening the open windows of closed body or cab types of motor vehicles. It includes window frame attaching mechanism being adjustable or variable in size.

U.S. Pat. No. 3,085,621 discloses a screen used in conjunction with an automobile designed to keep insects out of the interior of the vehicle and to allow the free circulation of air in and out of the vehicle. The reference does not seek to suppress "wind noise." The present invention relates to an impervious envelope that prevents air from freely circulating in and out of the vehicle. The article in the reference allows free circulation of air and does not emphasize noise suppression.

U.S. Pat. No. 3,411,562 discloses a temporary windshield for a motor vehicle. Claim 1 describes the invention as an elongated sheet of flexible transparent plastic material and includes a "plurality of transversely extending reinforcing rods, located in closely spaced apart parallel relationship." The windscreen is held in place by shutting the doors of the vehicle on either end. Accordingly, the only similarity between the present invention and the device depicted in the '562 reference is that the doors of the vehicles are used to secure the replacement window. However, the present invention is secured by simply closing the door on which it is used. Moreover, the structure of the present invention is significantly different from the item disclosed in the '562 patent.

U.S. Pat. No. 3,653,497 to Hornstein discloses a "shrunk-on plastic foil package" for motor vehicles which envelops the vehicle on all sides. Hornstein's plastic foil package covers the entire vehicle on the exterior of the automobile.

With respect to its position in use on the vehicle, it is not limited to covering only the upper portion of the vehicle door frame. It covers the front window of the automobile, as well as, the sides and rear of the vehicle. Its structure is totally different. A preferred embodiment in the '497 reference is an automobile covered by a continuous foil envelope (or hood) that contains a slit in the foil along hinge 34 of front door 16. The resulting flap of foil 38 to the rear of the slit at hinge 34 is then tucked inside the automobile 10. Another foil in the shape of a bag is pulled over the rearward end of the open door. The outside 42 of foil 40 is heat sealed to the edge of foil 36 located at hinge 34. A review of the text and FIG. 7 reveals that the "foil hood 40 in the shape of a bag" differs from the envelope of present invention in that bag 40 is not sealed along its forward vertical edge which is located at the leading edge of the door 16. Applicants' structure explicitly provides edges of the two sheets that are joined to each other at the top of the article and along its forward edge and its rearward edge to form an envelope. Applicants' envelope is open at the bottom but is sealed along its sides and top. Hornstein's bag does not have the forward edges of the bag sealed together. One edge of the exterior sheet comprising the bag is sealed in the vicinity of 36 to the foil covering the exterior of the car and forward edge of the other edge in the interior of the car. This structure would not meet the objectives of the present invention because if the leading edge of the exterior sheet of Applicants' invention is open, the air flow associated with a moving vehicle would enter the space between the door and the sheet and the sheet would billow out and allow the elements to enter into the window space into the interior of the vehicle. The leading edge of the envelope must be sealed.

U.S. Pat. No. 4,497,515 describes and illustrates stake-out curtains for automobiles consisting, with respect to a window of an automobile, of a pliable sheet of one-way viewing material wound on a spring roller and extendable therefrom to cover the window and secured in its extended position by electromagnetic mechanism, an operating circuit for the electromagnetic means so arranged that said electromagnetic mechanism will be actuated, and the one-way viewing sheet reeled on its roller, whenever the automobile engine is started.

U.S. Pat. No. 4,654,240 discloses a flexible plastic package used to store a liquid to be maintained under sterile conditions. It is used for totally different purposes from that of the present invention. While Johnston does disclose a pair of plastic sheets of the same dimensions, it differs from the present invention in that three of the sides [24, 26, 30] are sealed and the bottom is closed so that the end product is totally scaled such that the interior of the package is inaccessible without cutting it open. The cut article in the context of the '773 patent would have no utility.

U.S. Pat. No. 4,707,018 relates to a free standing sunshine assembly. The assembly is particularly adapted to be attached to a motor vehicle which enables a shade member to be retracted or extended in accordance with the needs of the motor vehicle operator. The shade includes a shade housing having an internal sunshade roller which stores the shade material. The shade is positioned and maintained in a desire extended or retracted position through the use of an elongated stiffener tape member having a crowned cross-sectional shape which provides bending stiffness. The stiffener tape is stored by coiling within a stiffener tape housing and is extended and retracted along with the shade material.

U.S. Pat. No. 4,743,061 discloses a motor vehicle sun shield for use on compound curved side windows, to protect occupant's face and eyes from excessive sunlight impingement. The sun shield includes a generally rectangular panel of rigid tinted plastic film, which is bendably to the window surface in the vehicle frontal and horizontal planes. The panel has an inwardly biasing permanent bend near to and parallel to its upper edge, and includes two spring wiring clips, which are frictionally attached and secured by perforated tabs to the panel upper edge. The opposite ends of the springs are U-shaped in form and are dimensioned to fit over and grip the top edge of vehicle side windows of various thicknesses and curvatures and to exert a rotary force pulling the panel into intimate contact with the window surface, The clips are of minimal frictional cross section and have rotational freedom that allows two point adaptive and warpless mounting of the sun shield to the curved upper window edge, delineated in the vehicle profile plane.

U.S. Pat. No. 4,749,222 describes and illustrates sun shades for vehicles. Combined with a vehicle glass window is (a) a sheet if vinyl plastic material applied to the surface of the window to electrostatically adhere to the window surface and act as a sun shield, (b) the sheet having a thickness less than about 0.02 inch, and (c) the maximum cross dimension of the sheet being less than 10 inches, whereby the sheet is easily shifted.

U.S. Pat. No. 4,875,308 relates to an adjustable insulating window which includes two glass sheets separated by and bonded to a bonding strand that is positioned inward relative to the peripheral edge surface of each of the glass sheets. A groove is formed along the peripheral edge surface of the window by the bonding strand and the peripheral edge of the two glass sheets, into which groove a profile strip is placed flush with at least one glass sheet and fastened by the bonding strand.

U.S. Pat. No. 4,889,754 is a temporary window. This device uses a flexible film which must be held in place with an adhesive, which can be messy, inconvenient to install, and which may require considerable effort to remove after use. It is not clear from evaluating the invention disclosed in the '754 reference in view of the method of attachment, how long the device can remain in place when the car is actually driven.

U.S. Pat. No. 5,044,776 describes and illustrates a resealable closure system for a non-rigid product bag. The resealable closure system is generally and adhesive strip affixed to a non-rigid product bag which allows the bag to be reclosed a multiple number of times. The resealable closure system has a permanent adhesive on the first surface such that the system can be affixed to a non-rigid product bag and positioned between the top and the bottom of the bag. The second surface of the bag has a controlled peel adhesive disposed thereon. A release liner containing perforations cut essentially perpendicular to the to the system's length cover the controlled peel adhesive until use. These perforations permit defined segments of the release liner to be removed to expose new areas of adhesive thereby providing fresh securing sites for subsequent closure and sealing of the bag.

U.S. Pat. No. 5,417,273 describes and illustrates a window vent apparatus having a window opening in a vehicle. The window has an opening edge and an anchoring member adjacent toe opening edge, a flexible window member having a perimeter edge, and at least two straps of different lengths. Each strap has a window fastener at a first end for engaging the perimeter edge and an anchoring member fastener at a second end for engaging the anchoring member. At least one of the straps is preferably elastic for creating tautness when installed on the window perimeter edge and the anchoring member, to hold the portion open.

A method is also provided for creating a vent in a vehicle flexible window where there is a window opening in the vehicle. The window opening has an opening edge, and an anchoring member adjacent the opening edge and a flexible window member. The flexible window member has a perimeter edge and is removably fastened with a fastener along the perimeter edge and around the opening edge. The flexible window member also has at least two straps of different lengths, each strap having a window fastener at a first end for engaging the perimeter edge and an anchoring member fastened and a second for engaging the anchoring member. The method includes the steps of unfastening a portion into an open position, fastening the anchoring member fastener to the anchoring member, and fastening the window fastener of one said strap to the portion perimeter edge.

U.S. Pat. No. 5,524,694 discloses an open mesh fabric material defined bihexagonal openings, which are fashioned into see-through, protective hood or cover. The hood or cover is fit over the upper of window portion of the door of a motor vehicle, and protects the occupants of the vehicle from rocks, bricks, blocks and other debris thrown at motor vehicle. Straps, coupled to the cover, loop around the bottom of the door for securing the cover over the window opening in the door. The straps are preferably elastic so that when fitted under the door the straps hold the cover in place over the window and exert a pulling force upon the cover to pull the open mesh material taut over the window opening. Alternatively, buckles or strap length adjusting hardware may be used to shorten the effective length of the straps. A clear transparent plastic sheet is connected to the cover, being positioned inside the hood so as to be situated between the inner surface of the window and the inside sheet of the cover. The plastic sheet is in relaxed or non-taut condition when the material of the cover is pulled taut over the window opening of the vehicle.

U.S. Pat. No. 5,879,048 relates to a safety restraining net for a car window. The restraining net includes a net frame, mesh webbing, and one or more attachment devices for attaching the restraining net to the vehicle door. At least one of the attachment devices may be configured for fastening below a hinge of the car door, a latch of the car door, and/or the bottom of the car door. Once installed, a net according to the invention allows doors and/or windows to open and close normally.

U.S. Pat. No. 6,063,477 by the same inventors herein discloses a temporary window which includes two sheets, made of a flexible transparent film and are cut to a preselected pattern corresponding to a shape adapted to cover the entire door frame around the opening of a broken window. The two sheets are attached adjacent to one another to form an envelope compatible in dimension with the door structure. Thus, the temporary window formed from the two sheets can be used to envelop and seal the area of the broken window without having to use any glue, tape, and sticky adhesives.

Notwithstanding the aforesaid prior art, the present invention is neither taught nor rendered obvious thereby.

SUMMARY OF THE INVENTION

The present invention is a plastic replacement window with extension, for vehicles, which includes two sheets of a flexible transparent film, attaching means for attaching the two sheets of a flexible transparent film, along a portion of edges of each of the two sheets wherein together the two sheets form an envelope, and an extension to the envelope being connectable to one of the two sheets through extension connecting means. The two sheets are pre-cut to a pattern that is shaped to snugly fit over a broken window frame on a vehicle. The envelope is sized and shaped to fit snugly over a frame of a vehicle door having the broken window. Moreover, the extension is made of sheet material which is impenetrable by shards of glass.

In use, when the extension is placed across a vehicle seat adjacent to the broken window and connected to the envelope, penetration of shards of glass into the clothing and person of one, sitting in the seat, is prevented.

The attaching means is selected from the group consisting of staples, adhesives, heat sealing, sonic sealing, and mechanical sealing. Each of the two sheets are between approximately 3.5 mils and approximately 10 mils. in thickness to allow for wind noise suppression together with tensile strength and optical clarity. The bottoms of the two sheets have at least one opening through which to receive means for holding the plastic replacement window with extension, for vehicles, in place on the motor vehicle door. The opening(s) is/are reinforced by a grommet. There is fastening means, which is inserted through the at least one opening to secure the plastic replacement window with extension, for vehicles in place to the vehicle door. Fastening means may be tie-down cords, hooked cords, chains and the like.

The extension connecting means includes filamentary loop and hook fasteners. The two sheets, forming the temporary window, are made of a material selected from the group consisting of polyester, transparent grade polyethylene terephthalate, biaxially oriented polypropylene, polyethylene, film grade polymethylmetharcylate, and film based on or containing polystyrene.

The temporary vehicle replacement window according to the present invention comprises the two sheets of transparent polymeric film attached to each other by a plastic melt or staples, or otherwise forming a two-layered transparent air-impervious composite envelope. The two sheets of transparent polymeric film can be cut or pulled open along a series of preselected lines such that this temporary window envelope can be opened along its preselected contours, making it adaptable to vehicle doors of various dimensions. In the alternative, the article can be manufactured in a variety of sizes to obviate the need for adjusting to a "one size fits all" model. The overall shape and geometry of the two-sheeted, composite, air impervious, temporary window envelope are calculated to envelop the entire upper portion of the door frame surrounding the broken window. The structure of the present invention also prevents the remaining fragments from falling into the vehicle from the door frame. The extension, which is connectable to one of the two sheets of the temporary window and covers the vehicle seat adjacent to the broken window, is made of a sheet composed of a polymeric or natural material that is impenetrable by shards of glass that may remain on the seat within the vehicle after the window has been broken. The polymeric or natural material may include film sheets, woven sheets and sheets formed of film coated woven material.

The novelty of the temporary replacement window system with extension described herein is that it can be effectively used to envelope and seal the area of the broken window and protect the seat of the person seated in the place in the vehicle adjacent to the broken window without having to use any glue, tape or other sticky or messy adhesives, which may result in an inadequate or imperfect seal. The presence of such an adhesive could cause clouding of the plastic or could cause other visibility problems, should same contact the transparent portions of the plastic through which the user needs to look.

The various features of novelty which characterize the invention as pointed out with particularity in the claims annexed to and forming part of the disclosure. For a better understanding of the invention, its operating advantages, and specific objects attained by its use, reference should be had to the drawings and descriptive matter in which there are illustrated and described, preferred embodiments of the invention.

BRIEF DESCRIPTION OF THE DRAWINGS

The present invention should be more fully understood when the specification herein is taken in conjunction with the drawings appended hereto wherein:

FIG. 1 illustrates a typical temporary window, which is an element of the present invention plastic replacement window with extension, for vehicles, having a pre-selected pattern corresponding to its use on any given vehicle side door window when the temporary window is laid over the door frame of the vehicle;

FIG. 2 is an enlarged cross-sectional cut view of the temporary window of FIG. 1 along 2—2 of FIG. 1, illustrating two typical sheets which are precut and notched for additional fastening;

FIG. 3 illustrates the typical installation of the temporary window on a vehicle.

DETAILED DESCRIPTION OF THE PRESENT INVENTION

Figure 4:
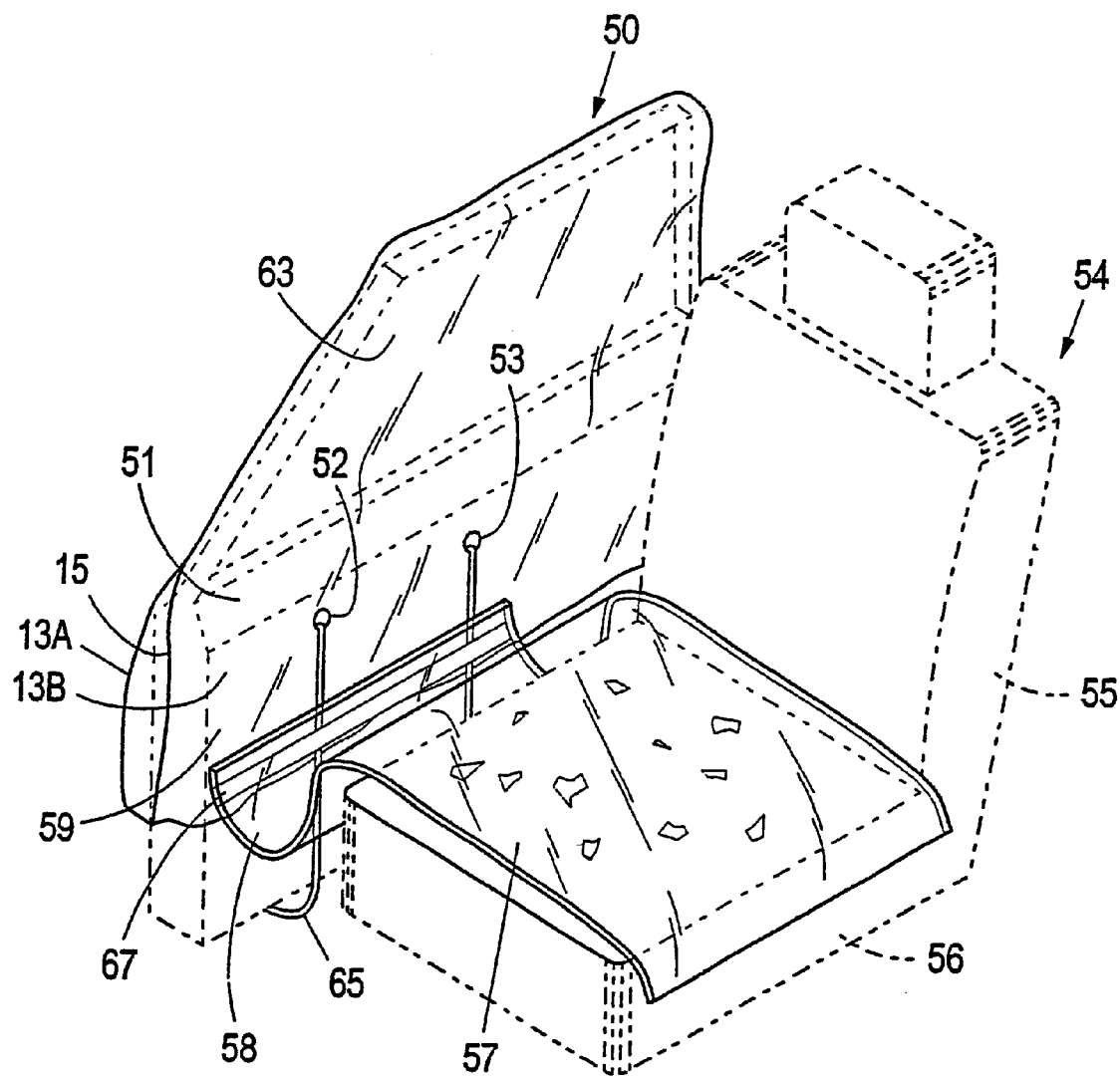
FIG. 4 illustrates a present invention plastic replacement window with extension, for vehicles having a temporary window and an extension.

The associated advantages of using the temporary window with extension, according to the present invention, can best be understood by referring to the drawings. Referring now more specifically to FIG. 1 through FIG. 3, there is shown a temporary window 10 comprising two sheets of a flexible, transparent, continuous surface, substantially impermeable, film 11A and 11B, forming an envelope which is sized and shaped to fit snugly over the upper half of the door on almost any vehicle or the like such that it will completely envelope the broken or shattered shards of glass resulting in the broken window. As illustrated in the drawings, the temporary window 10 is preferably made of two sheets of the film 11A and 11B having the properties mentioned hereinabove. Each sheet 11A and 11B is made of relatively thick transparent film of flexible polymeric material. Each sheet 11A and 11B is precut to a pattern that will fit over and around a vehicle door frame 29.

The exact overall cut and size of transparent, etc., film 11A and 11B is such that they will cover and extend around the entire door frame 29 of the vehicle 20. The front edge of temporary window 10 can thus be trimmed or folded around the entire door frame 29. In this manner, the temporary window 10 will be around the window frame on the vehicle door sealing the entire opening of the window.

It should be understood that the exact dimensions of temporary window 10 vary depending upon the specific vehicle door frame involved. Thus, the overall shape and size of the temporary window may vary. In addition, apertures or notches 12 may be provided at the lower corners of the temporary window 10 to accommodate windows 10 of various sizes. Exactly how the temporary window 10 is installed is the same because once a pattern is cut for a particular vehicle, the temporary window 10 will slip over the door frame of the vehicle and fit snugly in place without the use of any glue, adhesive or other sticky adhesive.

The two sheets of transparent film 11A and 11B are cut preferably from 4.5–6.5 mil up to 10 mil polyester such as transparent grade polyethylene terephthalate and related copolymers; of biaxially oriented polypropylene, polyethylene, other transparent polyolofins, acrylics, such as film grade polymethylmetharcylate and related copolymers, film based on or containing polystyrene. However, any polymer that meets the requirements that the film be flexible, transparent, substantially impermeable and a dimensionally stable, continuous film capable of forming an envelope, can be used. The means of attaching the two sheets 11A and 11B at the top and sides thereof are selected from the group consisting of stapling, gluing, heat sealing, sonic sealing or mechanical sealing. For the preferred vehicle window application, such thickness noted above will result in the suppression of wind noise during use which continues to improve up to about 10 mil thickness. The two sheets 11A and 11B of the present invention can be made of any of the plastic films described, to exhibit wind noise suppression yet maintain its tensile strength and optical clarity. The film is substantially air impervious which keeps the vehicle substantially free from exposure to weather conditions as well as wind noise.

The manufacture of two sheets 11A and 11B of the temporary window, according to the present invention, can be by various methods that are generally known in the art to fabricate laminated polyester or polyolefin, and the like. Means for precutting the preselected pattern or shape of the two sheets of transparent film 11A and 11B which are combined to make temporary window 10, are generally known in the art.

In FIGS. 1 and 2, there is illustrated a temporary replacement window 10 wherein two openings or notches 12 are symmetrically positioned parallel to each other along the open edge of the attached sheets. These notches 12 are reinforced with grommets so that a fastening cord can be passed from the outside of the vehicle door 21 to a door protrusion in the interior so as to further secure the replacement window.

Referring to FIG. 2, temporary replacement window 10 comprises a transparent outside sheet 11A and a transparent inside sheet 11B. Referring to FIG. 1, each sheet 11A and 11B has a top 37, a bottom 38 and sides 39, 40. Outside sheet 11A and inside sheet 11B are joined to each other at top 37 and sides 39, 40 to form an envelope having an opening on the bottom 38. As depicted in FIG. 3, temporary replacement window 10 is positioned to cover and extend around the upper portion of the motor vehicle door 21. Temporary replacement window 10 is generally configured to correspond to vertical 30, horizontal 31 and oblique 32 shape of the upper perimeter of the vehicle door 21. The temporary replacement window 10 covers exterior side, interior side, not shown, substantially to a top side of the vehicle door 21. The sheets 11A and 11B are sufficiently flexible to allow the motor vehicle door 21 to be closed against vehicle body 20 while the envelope formed by sheets 11A and 11B is in place. The dimensions of the two sheets 11A and 11B comprising the envelope of the present invention correspond to each other, that is they are substantially the same distance top to bottom and side to side.

Moreover, as shown in FIG. 3, the temporary replacement window 10 of the present invention is used in combination with a motor vehicle door 21 secured to a motor vehicle body 20. The motor vehicle door 21 includes a base 22 having a substantially rectangular panel portion 23 having an exterior side 24, an interior side not shown, top 25, and bottom 26, and a frame portion 29 defining the upper perimeter of said motor vehicle door 21 situated atop said panel 23 and integrally connected thereto. The frame portion 29 includes vertical 30, horizontal 31 and oblique 32 components which are suitable to enclose a glass window. The vertical 30, horizontal 31 and oblique 32 components each have an outer edge 34 and an inner edge, not shown, in substantially the same vertical plane as exterior side 24 and interior side, not shown, of the motor vehicle door 21. The frame portion extends from one connection point 35 on panel 23 to a second connection point 36 on panel 23.

FIG. 4 illustrates a present invention device having an extension 57 which is attached to a temporary window 50. The temporary window 50 shown in FIG. 4 is similar to the temporary window 10 shown in FIG. 1 and FIG. 2. The temporary window 50 has a transparent outside sheet 13A and a transparent inside sheet 13B, which are joined together at top and sides along a seam 15. In this embodiment, the temporary window 50 extends downwardly from a broken window door frame opening 63 and over a vehicle door 51. Moreover, the temporary window 50 has an inside portion 59 relative to the vehicle door 21, which extends into the vehicle.

The temporary window 50 is modified by adding the seatcover improvement, i.e., extension 57, which may be connected, i.e., connectable, to one of the two sheets 13A, 13B at the inside portion 59 of the temporary window 50 through extension connecting means. The extension 57 is situated in the vehicle when it is connected to the inside portion 59. The extension 57 is detachable and is fabricated from KEVLAR®, TYVEK®, or like material. In use, the seat attachment or extension 57 is placed across a horizontal seat support section 56 of the driver/passenger's seat 54 adjacent to the broken window, and, being placed such, protects against the penetration of the driver's/passenger's clothing and person by shards of glass, which are contained under the extension 57. The extension 57 covers the driver/passenger's seat which is adjacent to the broken window. The extension 57 is made of a dimensionally stable material which will not be penetrated or punctured by the shards of glass on the seat. In other words, the dimensions remain firmly established without any significant fluctuation. The extensible seat cover 57, i.e., extension must be detachable to permit the person in the vehicle to position it before sitting down in the vehicle. Once seated, the driver/passenger can then connect the side adjacent the broken window to the inside portion 59 further securing the replacement window 50 in position. The extension 57 may contain a pocket sufficient to hold a pair of KEVLAR®-TYVEK® gloves which are worn to prevent injury from the shards of glass resulting from the broken window when removing the shards.

FIG. 4 illustrates vehicle door 51 covered by temporary replacement window 50. Vehicle door 51 includes opening 63 normally occupied by the vehicle's original window, which is covered by temporary replacement window 50 having grommets 52 and 53 located thereon. Temporary replacement window 50 includes a tie-down cord 65 that is passed into the interior of the vehicle from the exterior and is secured to some protuberance from the interior door 51. Alternatively, the cord may include hooks on their ends so that they may grip the base of the door 51. A seat 54 within the vehicle includes back support section 55 and horizontal seat support section 56. Extension 57 is laid across horizontal seat support section 56 and is connectable on one side 58 to the inside portion 59 of the temporary replacement window 50. The extension 59 is sized and shaped to fit over the vehicle seat 56. Obviously, extension 57 is of sufficient dimensions to protect the passenger or driver in the vehicle. The inside portion 59 of the temporary replacement window 50 includes a VELCRO® strip, not shown, which allows easy attachment/detachment of the temporary replacement window 50 to the extension 57, which has a corresponding VELCRO® strip 67. Other extension connecting means include adhesive strips, preferably reusable, and the like.

The advantages and benefits of the present invention are many. For example, the temporary window 10 is relatively inexpensive and highly versatile in that it can be readily applied to various sizes and shapes of doors encompassing broken windows in vehicles. While the present invention preferably is used in combination with vehicle doors, it is readily apparent that the envelope can be used in combination with any vehicle that contains a door frame having a window. Thus any truck, tractor-trailer combination, golf cart, factory vehicle, etc. having a door that contains a broken shattered, or damaged window can use the temporary window of the present invention.

Thus, while there have been shown and described and pointed out fundamental novel features of the invention as applied to currently preferred embodiments thereof, it will be understood that various omissions and substitutions and changes in the form and details of the apparatus illustrated, and in their operation, may be made by those skilled in the art without departing from the spirit of the invention. In addition, it is to be understood that the drawings are not necessarily drawn to scale but that they are merely conceptual in nature. It is the intention, therefore, to be limited only as indicated by the scope of the claims appended herein.

What is claimed is:

1. A temporary plastic replacement window with extension, for vehicles, comprising:
    (a) two sheets of a flexible transparent film pre-cut to a pattern that is shaped to snugly fit over a broken window frame on a vehicle;
    (b) attaching means for attaching said two sheets of a flexible transparent film, along a portion of edges of each of said two sheets wherein together said two sheets form an envelope, said envelope being sized and shaped to fit snugly over said broken window frame on the vehicle; and
    (c) an extension to said envelope being connectable to one of said two sheets through extension connecting means wherein said extension is made of sheet material which is impenetrable by shards of glass; such that when said extension is placed across a vehicle seat adjacent to the broken window and connected to said envelope, penetration of shards of glass into one's clothing and person, sitting in the seat, is prevented.

2. The temporary plastic replacement window with extension, for vehicles of claim 1 wherein said attaching means is selected from the group consisting of staples, adhesives, heat sealing, sonic sealing, and mechanical sealing.

3. The temporary plastic replacement window with extension, for vehicles of claim 2 wherein each of said two sheets are between approximately 3.5 mils and approximately 10 mils. in thickness to allow for wind noise suppression together with tensile strength and optical clarity.

4. The temporary plastic replacement window with extension, for vehicles of claim 3 wherein each of said two sheets has a bottom wherein at least one of said bottoms has at least one opening therethrough to receive fastening means for fastening said temporary plastic replacement window with extension on the vehicle door wherein said at least one opening is reinforced by a grommet.

5. The temporary plastic replacement window with extension, for vehicles of claim 4 wherein said fastening means is inserted through said at least one opening to secure said temporary plastic replacement window with extension to the vehicle door.

6. The temporary plastic replacement window with extension, for vehicles of claim 5 wherein said fastening means is selected from the group consisting of tie-down cords, hooked cords and chains.

7. The temporary plastic replacement window with extension, for vehicles of claim 6 wherein said extension connecting means is selected from the group consisting of filamentary loop and hook fasteners, and adhesive.

8. The temporary plastic replacement window with extension, for vehicles of claim 7 wherein said extension is made from a material selected from the group consisting of polymeric material and natural material.

9. The temporary plastic replacement window with extension, for vehicles of claim 8 wherein said extension is sized and shaped to fit over the a vehicle seat.

10. The temporary plastic replacement window with extension, for vehicles of claim 1 wherein each of said two sheets are between approximately 3.5 mils and approximately 10 mils. in thickness to allow for wind noise suppression together with tensile strength and optical clarity.

11. The temporary plastic replacement window with extension, for vehicles of claim 10 wherein each of said two sheets has a bottom wherein at least one of said bottoms has at least one opening therethrough to receive fastening means for holding said temporary plastic replacement window with extension on said motor vehicle door wherein said at least one opening is reinforced by a grommet.

12. The temporary plastic replacement window with extension, for vehicles of claim 11 wherein said fastening means is inserted through said at least one opening to secure said temporary plastic replacement window with extension to the vehicle door.

13. The temporary plastic replacement window with extension, for vehicles of claim 12 wherein said fastening means is selected from the group consisting of tie-down cords, hooked cords and chains.

14. The temporary plastic replacement window with extension, for vehicles of claim 13 wherein said extension connecting means is selected from the group consisting of filamentary loop and hook fasteners, and adhesive.

15. The temporary plastic replacement window with extension, for vehicles of claim 14 wherein said extension is made from a material selected from the group consisting of polymeric material and natural material.

16. The temporary plastic replacement window with extension, for vehicles of claim 15 wherein said extension is sized and shaped to fit over the vehicle seat.

17. The temporary plastic replacement window with extension, for vehicles of claim 1 wherein each of said two sheets has a bottom wherein at least one of said bottoms has at least one opening therethrough to receive connecting means for holding said temporary plastic replacement window with extension on said motor vehicle door wherein said at least one opening is reinforced by a grommet.

18. The temporary plastic replacement window with extension, for vehicles of claim 17 wherein said extension is made from a material selected from the group consisting of polymeric material and natural material.

19. The temporary plastic replacement window with extension, for vehicles of claim 18 wherein each of said two sheets are between approximately 3.5 mils and approximately 10 mils. in thickness to allow for wind noise suppression together with tensile strength and optical clarity.

20. The temporary plastic replacement window with extension, for vehicles of claim 19 wherein said extension is sized and shaped to fit over the vehicle seat.

* * * * *